Oct. 27, 1925.
1,558,887
L. JACKSON
ANIMAL HEAD CHECK
Filed March 30, 1925
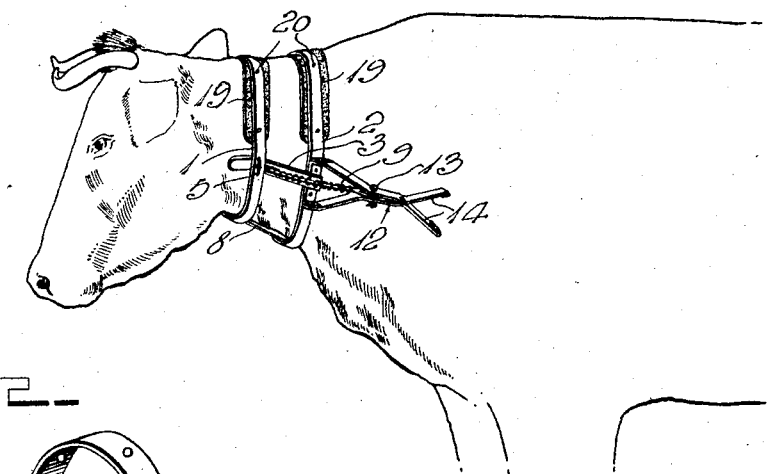
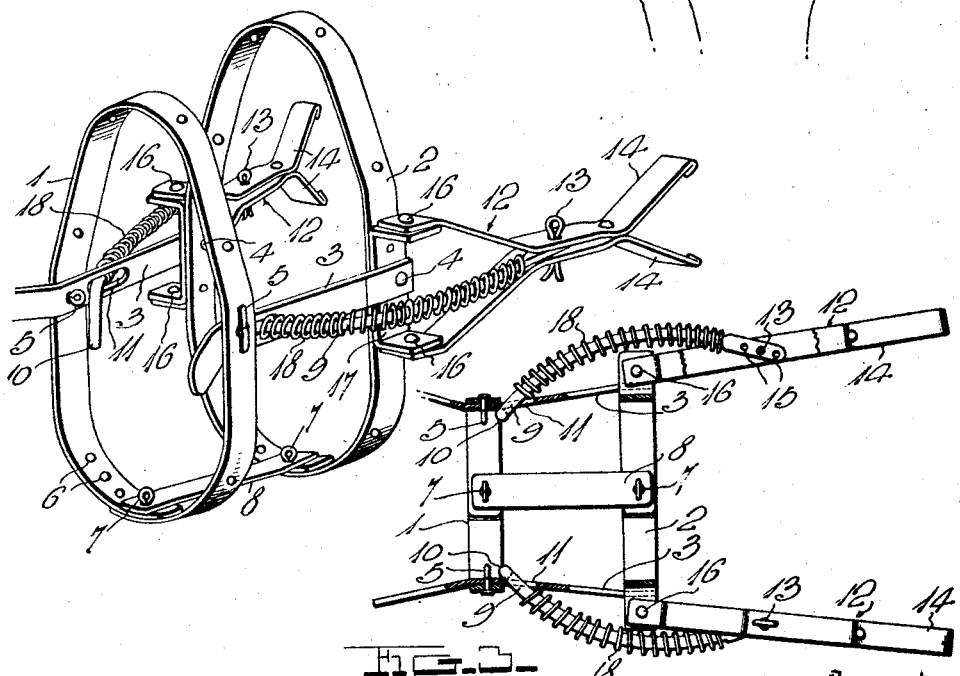
Inventor
L. Jackson Patented Oct. 27, 1925.

1,558,887

UNITED STATES PATENT OFFICE.

LEWIS JACKSON, OF SIMPSON, KANSAS.

ANIMAL HEAD CHECK.

Application filed March 30, 1925. Serial No. 19,441.

*To all whom it may concern:*

Be it known that I, LEWIS JACKSON, a citizen of the United States, residing at Simpson, in the county of Mitchell and State of Kansas, have invented certain new and useful Improvements in Animals' Head Checks; and I do declare the following to be a full, clear, and exact description of the invention, such as will enable others skilled in the art to which it appertains to make and use the same.

My invention aims to provide a simple, inexpensive and efficient device which will prevent cows from reaching their own udders and consuming the milk therefrom, and a further aim is to provide a device of this character which will have a tendency to choke the cow as soon as she throws her head rearwardly beyond a predetermined extent.

With the foregoing in view, the invention resides in the novel subject matter hereinafter described and claimed, the description being supplemented by the accompanying drawing.

Figure 1 is a perspective view showing the application of the invention.

Figure 2 is a perspective view of the device as manufactured and placed on sale.

Figure 3 is a plan view partly broken away and in horizontal section.

Briefly described, the invention comprises a collar to surround the animal's neck, choking means movably mounted on said collar and projectible inwardly therefrom, and operating means for said choking means extending rearwardly from the collar and adapted to operate whenever the animal swings her head rearwardly beyond a predetermined extent.

The collar, in the form of construction shown, comprises front and rear metal bands 2 connected by a pair of metallic side straps 3, which straps are preferably riveted at 4 to the rear band, but loosely connected by cotter pins or the like 5, with the front band, so that flexure of the neck is not retarded. The metal straps forming the collars 1 and 2, have their ends overlapped and formed with openings 6, through any of which, cotter pins 7 or other suitable fasteners may be passed to hold the bands around the animal's neck. These same fasteners, preferably connect the ends of a spacing strip 8 with the lower ends of the bands 1 and 2, as shown.

In the present embodiment of the invention, the choking means comprises a pair of curved rods 9 having laterally turned front ends 10 disposed at the inner side of the collar, the latter being provided with guides through which the rods pass slidably. These guides are shown in the form of slots 11 through the straps 3. The preferred operating means for the choking means, comprises two levers 12 which diverge rearwardly from the collar and are pivoted at 13 to the rods 9. Preferably, each of the levers 12 is formed of upper and lower metal straps 14 whose front and rear end portions diverge as shown, and the pivots 13 are preferably in the form of cotter pins which may be passed through any of a plurality of openings 15 in the rear ends of the rods 9, which ends may well be flattened. I have shown the front ends of the straps 14 pivoted at 16 to the arms of U-shaped brackets 17 which are riveted or otherwise secured to the collar, said brackets being in the present instance, secured to the band 2.

Appropriate means are provided to normally hold the choking means in engagement with the animal's neck, coil springs 18 being preferably provided for this purpose, said springs surrounding the rods 9, having their front ends in contact with the straps 3 and having their rear ends in abutting relation with the widened rear ends of said rods.

The construction shown and described may be easily and inexpensively manufactured and marketed, may be quickly and easily applied to or removed from the animal's neck, may be adjusted at will according to the size of the animal, and will in all instances be highly effective. As soon as the animal throws her head in one direction or the other beyond a predetermined extent, one of the levers 12 strikes her shoulder, thus forcing forwardly on the connected rod 9 and causing its front end 10 to force into her neck. She thus feels the sensation of choking and immediately returns her head to its foremost position.

In order to prevent chafing of the neck, the bands 1 and 2 are by preference provided with pads 19, of leather, webbing or the like, which pads may well be secured in place by rivets 20.

As excellent results have been obtained from the details disclosed, such details are preferably followed. However, within the scope of the invention as claimed, modifications may of course be made.

I claim:

1. A device of the class described comprising a collar adapted to surround an animal's neck, choking means carried by said collar and projectible inwardly therefrom, and operating means for said choking means carried also by the collar and including rearwardly projecting members for disposition at opposite sides of the animal's body.

2. A device of the class described comprising a collar adapted to surround an animal's neck, opposite sides of said collar having guides, a pair of rods passing from the exterior of the collar to the interior thereof through said guides and having front ends adapted for engagement with the animal's neck, and rearwardly projecting levers fulcrumed to the collar for disposition at opposite sides of the animal's body, said levers being pivotally connected with the rear ends of said rods.

3. A structure as specified in claim 2; each of said levers being formed from upper and lower straps of metal whose end portions are in diverging relation with each other, the rear ends of the rods being disposed between and connected with the intermediate portions of said straps.

4. A device of the class described comprising a collar consisting of front and rear neck-encircling bands and a pair of opposed straps connecting the vertical sides of said bands, said straps having openings, a pair of rods passing slidably through said openings from the exterior of the collar to the interior thereof and having front ends adapted to engage an animal's neck, and a pair of levers pivoted on vertical axes to the rear band and projecting rearwardly therefrom for disposition at opposite sides of the animal's body, said levers being pivoted to the rear ends of said rods.

5. A device of the class described comprising a collar consisting of front and rear neck-encircling bands and a pair of opposed straps connecting the vertical sides of said bands, said straps having openings, a pair of rods passing slidably through said openings from the exterior of the collar to the interior thereof and having front ends adapted to engage an animal's neck, a pair of levers projecting rearwardly from the rearmost of said bands, each lever being formed of upper and lower metal straps whose end portions are disposed in diverging relation with each other, means pivotally mounting the rear ends of the aforesaid rods between the intermediate portions of said upper and lower lever-forming straps, and U-shaped brackets secured to the aforesaid rear band, the front ends of said lever-forming straps being pivoted on vertical axes to the ends of said brackets.

In testimony whereof I have hereunto affixed my signature.

LEWIS JACKSON.